(12) United States Patent
Dandl et al.

(10) Patent No.: US 11,338,564 B2
(45) Date of Patent: May 24, 2022

(54) DEVICE AND METHOD FOR LAMINATING A LAMINATING FOIL ELEMENT ONTO A COMPONENT, DEVICE AND METHOD FOR APPLYING ADHESIVE, SYSTEM FOR LAMINATING, COMPONENT TO BE LAMINATED WITH A LAMINATING FOIL ELEMENT, AND USE OF A DEPOSIT PART FOR KEEPING READY A LAMINATING FOIL ELEMENT

(71) Applicant: Persico SpA, Nembro (IT)

(72) Inventors: Andreas Dandl, Laufen (DE); Josef Rehrl, Teisendorf (DE); Hubert Rehrl, Teisendorf (DE)

(73) Assignee: PERSICO SPA, Nembro (IT)

( * ) Notice: Subject to any disclaimer, the term of this patent is extended or adjusted under 35 U.S.C. 154(b) by 223 days.

(21) Appl. No.: 16/496,056

(22) PCT Filed: Mar. 22, 2018

(86) PCT No.: PCT/DE2018/000070
§ 371 (c)(1),
(2) Date: Sep. 20, 2019

(87) PCT Pub. No.: WO2018/171826
PCT Pub. Date: Sep. 27, 2018

(65) Prior Publication Data
US 2020/0108590 A1    Apr. 9, 2020

(30) Foreign Application Priority Data

Mar. 22, 2017  (DE) .......................... 102017002772.2
Jun. 23, 2017  (DE) .......................... 102017005923.3

(51) Int. Cl.
*B32B 37/10*    (2006.01)
*B32B 37/12*    (2006.01)
(Continued)

(52) U.S. Cl.
CPC ............ *B32B 37/1009* (2013.01); *B30B 5/02* (2013.01); *B32B 37/0076* (2013.01);
(Continued)

(58) Field of Classification Search
CPC .................................................. B32B 37/1009
See application file for complete search history.

(56) References Cited

U.S. PATENT DOCUMENTS 3,753,830 A    8/1973  Cruckshank et al.
5,080,749 A *  1/1992  Moriya ................. B29C 65/749
                                                          156/382

(Continued)

FOREIGN PATENT DOCUMENTS

FR    2757103 A1    6/1998
FR    2863195 A1    6/2005
WO    2014131918 A1    9/2014

OTHER PUBLICATIONS

International Search Report and Written Opinion for Application No. PCT/DE2018/000070 dated Sep. 7, 2018.

*Primary Examiner* — Christopher T Schatz
(74) *Attorney, Agent, or Firm* — Tarolli, Sundheim, Covell & Tummino LLP (57) ABSTRACT

The invention relates to a device for laminating a laminating foil element onto a component having a profiled lamination plane using a lamination tool, by means of which tool the laminating foil element is laminated onto the component, the lamination tool comprising a first tool half and a second tool half, and the device comprising a deflection arrangement for deflecting portions of the laminating foil element out of the profiled lamination plane.

7 Claims, 7 Drawing Sheets

(51) Int. Cl.
*B30B 5/02* (2006.01)
*B32B 37/00* (2006.01)
*B29C 51/16* (2006.01)
*B29C 43/36* (2006.01)

(52) U.S. Cl.
CPC ...... *B29C 51/16* (2013.01); *B29C 2043/3647* (2013.01); *B32B 37/12* (2013.01); *B32B 2309/68* (2013.01)

(56) References Cited

U.S. PATENT DOCUMENTS

| | | | |
|---|---|---|---|
| 5,201,981 A | 4/1993 | Whiteside | |
| 5,700,542 A | 12/1997 | Pirchl | |
| 5,811,053 A * | 9/1998 | Ota | B29B 11/06 |
| | | | 264/511 |
| 5,951,802 A * | 9/1999 | Deeks | B29C 33/12 |
| | | | 156/214 |

* cited by examiner

DEVICE AND METHOD FOR LAMINATING A LAMINATING FOIL ELEMENT ONTO A COMPONENT, DEVICE AND METHOD FOR APPLYING ADHESIVE, SYSTEM FOR LAMINATING, COMPONENT TO BE LAMINATED WITH A LAMINATING FOIL ELEMENT, AND USE OF A DEPOSIT PART FOR KEEPING READY A LAMINATING FOIL ELEMENT

RELATED APPLICATIONS

The present invention is a U.S. National Stage under 35 USC 371 patent application, claiming priority to Serial No. PCT/DE2018/000070, filed on 22 Mar. 2018; which claims priority of DE 10 2017 005 923.3, filed on 23 Jun. 2017 and DE 10 2017 002 772.2, filed on 22 Mar. 2017, the entirety of both of which are incorporated herein by reference.

The invention relates to a device for laminating a laminating foil element onto a component having a profiled lamination plane using a lamination tool, by means of which the laminating foil element is laminated onto the component, the lamination tool comprising a first tool half and a second tool half.

The invention also relates to a device for applying adhesive on a surface of a laminating foil element for laminating an automotive lining component with an application device for applying adhesive on the surface of the laminating foil element on an application plane, having a transport unit for generating a relative movement between the application device and the laminating foil element.

Furthermore, the invention relates to system for laminating a component with a laminating foil element, comprising a device for laminating the laminating foil element onto the component and comprising a transport unit for transporting the laminating foil element to the lamination device.

The invention additionally relates to a method for laminating a laminating foil element onto a component.

The invention also relates to a method of applying adhesive on a surface of a laminating foil element for laminating a component, in particular an automotive lining component, wherein the application device for a planar spreading of the adhesive and the surface of the laminating foil element are brought in effective contact with each other on an application plane, and wherein the application device and the laminating foil element are moved relative to one another for planar application of the adhesive on the surface.

The invention also relates to a component to be laminated with a laminating foil element, the component having at least one area to be laminated permanently, onto which the laminating foil element can be laminated permanent on a lamination plane, in particular on a profiled lamination plane.

Furthermore, the invention also relates to use of a deposit part for keeping ready a laminating foil element.

In particular, such generic devices, devices for laminating a component with a foil element, as well as methods implemented in this manner, in particular for applying adhesives on a component in order to manufacture a higher-value component laminated with a foil element or the like, in particular an automotive lining component, are known from the state of the art.

With conventional devices and methods for laminating laminating foil elements on components, often a complete laminating foil element is applied, which frequently requires more effort for subsequent method steps.

In particular in currently used devices and methods for applying adhesive on a surface of a laminating foil element in order to laminate, for instance, an automotive lining component, as well as in generic devices for laminating a component with a laminating foil element, adhesive is applied on the entire foil. In other words, adhesive is applied on the entire surface area of the face of the laminating foil element which is brought in effective contact with the component.

In order to laminate areas of a component, on which no foil has been applied, without adhesive, substantial subsequent effort in terms of process engineering and construction are necessary, by means of which it can be ensured that predetermined areas of the lamination component are not laminated or at least not permanent laminated, in other words that the laminating foil element is partially removed from certain areas of the laminating foil element.

In general, this increases costs of the employed tools by approximately 40%, wherein in addition, adhesive applied on the non-laminated areas of the component goes to waste, additionally raising the costs of manufacturing laminated components, in particular automotive lining components. This waste of adhesive also puts additional stress on the environment.

It is the object of the invention to overcome at least the abovementioned disadvantages and to further develop generic devices and methods accordingly.

According to a first aspect of the invention, this object is achieved by a device for laminating a laminating foil element on a component with a profiled lamination plane by means of a lamination tool, by means of which the laminating foil element is laminated onto the component, the lamination tool comprising a first tool half and a second tool half and the device comprising a deflection arrangement for deflecting portions of the laminating foil element out of the profiled lamination plane.

Advantageously, the deflection arrangement for deflecting portions of the laminating foil element out of the profiled lamination plane makes it possible, that even portions of the laminating foil element which are provided with adhesive do not come in effective contact with the component or only to a non-critical extent, at least temporarily.

Advantageously, in this manner, areas of the component which are not to be laminated do not, or not permanently, come in contact with a laminating foil element e. g. until after an adhesive has lost a substantial amount of its adhesive force.

In this context, it is useful if at least one of the two tool halves comprises the deflection arrangement, wherein a deflection cavity of the deflection arrangement is located in the at least one tool half. In this manner, contact between areas of the component which are not to be laminated and the laminating foil element can be avoided temporarily, as desired according to the invention, by simple constructive means.

It is particularly advantageous if deflection cavities of the deflection arrangement have at least partially corrugated or waffle-shaped walls.

This helps to achieve, first, a surface enlargement of the tool and in particular also of the laminating foil element, achieving in turn more effective cooling of the adhesive present in these areas.

Secondly, this significantly reduces the risk of unintentional adhesive bonding of the laminating foil element and the carrier element in areas of the component which are not intended to be laminated.

In addition, this helps to achieve better inherent stability of the laminating foil element.

For a better and faster cooling of adhesives, it is advantageous for the deflection cavities of the deflection arrangement to be cooled.

Therefore, an improved embodiment provides, cumulatively or alternatively, a fluid flushing unit in the device by means of which spaces between the carrier part or component to be laminated and the laminating foil element can be flushed with a fluid, preferably with air. This helps to achieve an even more effective cooling of the adhesive.

The deflection cavities can be separated from surrounding areas by simple constructive means if deflection cavities of the deflection arrangement are spatially separated from lamination contact areas by means of sealing elements.

If deflection cavities of the deflection arrangement are embodied as vacuum cavities, the laminating foil element can very easily be partially deflected in the sense of the invention.

It is understood that the deflection arrangement can have very different embodiments. The deflection arrangement can be integrated in the present device very well if there is a pressure difference unit on the device or on a corresponding lamination tool, the lamination tool being designed such that by means of the pressure difference unit, at least part of the component can be deflected from a lamination plane, in particular from a profiled lamination plane, of the lamination tool into the deflection cavity.

In a second aspect of the invention, the object of the invention is achieved by a device for applying adhesive on a surface of a laminating foil element for laminating a component, in particular an automotive lining component, with an application device for applying adhesive on the surface of the laminating foil element on an application plane, having a transport unit for generating a relative movement between the application device and the laminating foil element, wherein the device comprises a deflection arrangement for deflecting portions of the laminating foil element out of the application plane.

By means of such a deflection arrangement, one, preferably more than one portions of a laminating foil element can be deflected out of the actual foil plane of the respective laminating foil element such that these deflected portions will not be accessible by the application device while adhesive is applied.

In this manner, a geometrical space between the application device and portions of the respective laminating foil element will be created.

In other words, the deflected portions will remain free from adhesive.

Thus, areas which are to be laminated without adhesive, that is, areas of a laminating foil element which are free from adhesive, such as, for instance, foil endings formed by a tool, can be created outside a tool of a lamination device.

This process advantageously already takes place during the actual application of adhesive on a laminating foil element, resulting both in a substantially simplified plant construction and in a much simpler process method.

Thus, advantageously, on the one hand, lamination can take place in a well-known manner with a conventional "standard" lamination tool and on the other hand, a portion of the laminating foil element which is left free from adhesive can be laminated onto the component or carrier part in a non-adhesive manner, creating no or only a neglectable bonding with the carrier part or the component to be laminated, respectively.

Therefore, these portions of the laminated laminating foil element which are left free from adhesive can at a later point be easily drawn off the laminated component as foil residues, in particular after an adapted punching process.

It should be emphasized already at this point that the application device can be characterized by different types of application means in terms of construction. An application device suitable for implementing the present invention can comprise, for instance, an application roller element rolling on the surface of the respective laminating foil element and transferring adhesive adhering to the application roller element to the surface of the laminating foil element.

The expression "application plane" designates a plane, preferably a substantially horizontal plane, on which an application of adhesive to a surface of a laminating foil element takes place.

In other words, the surface of the laminating foil element which faces the application device is located on this application plane or arranged in parallel to it.

Preferably, on this application plane, application means of the application device are in effective contact with the respective laminating foil element.

The expression "adhesive" here designates adhesion means with which a particularly close effective contact or connection between the laminating foil element to be applied and a component or carrier part, respectively, can be established.

Such adhesion means can be of very different types, for instance special adhesives for preferably establishing adhesive bonding of plastics, but also as thermally activatable adhesives or the like.

In the context of the invention, the expression "laminating foil element" designates an element which can be laminated onto a component for yielding a product which gives an impression of high value both in optical and in haptic terms, such as an automotive lining component or the like. That is, the laminating foil element is a decorative layer for upgrading a component. Normally, such a laminating foil element is provided in the form of a foil web and preferably as a prefabricated foil.

Consequently, the expression "component" designates the actual carrier part which finally bears the laminating foil element and which in general is a finished product obtained after lamination, such as, specifically, an automotive lining component.

In the context of the invention, the expression "transport unit" designates any unit by means of which the application device and components, in particular laminating foil elements, can be moved in relation to one another in order to transfer adhesive from the application device to the components, in particular the laminating foil elements, in a planar manner. It has proved worthwhile to move translational the components, in particular the laminating foil elements, in the application direction by means of the transport unit in order to apply adhesive on the components, in particular on the laminating foil elements. With a respective design of the transport unit, it is also possible, cumulatively or alternatively, to move the application device with respect to the components, in particular to the laminating elements.

Deflections of the laminating foil element during application of the adhesive can be initiated very easily by means of construction, by arranging the deflection arrangement and the application device at least partially on different sides of the application plane and the laminating foil element, respectively. This makes a deflection of the laminating foil element away from the application device very simple in regard to a construction.

In addition, the application device is constructively not in conflict with the deflection arrangement, since the deflection arrangement is positioned opposite to the application device.

Therefore, it is advantageous for the application plane to be arranged between the application device and components of the deflection arrangement. In this manner, clearly defined functional spaces are created for the application device, which can further simplify the construction of the application device.

Advantageously, in this way, even existing plants for laminating a component with a laminating foil element can be easily retrofitted by means of the proposed application device.

According to the invention, the deflection arrangement can be implemented by various technical means for deflecting the laminating foil element out of the lamination plane. Some possibilities are contact-based gripper or suction devices or the like.

A preferred embodiment provides for the deflection arrangement to comprise a pressure difference pump for creating a vacuum in order to lift portions of the laminating foil element's surface from application means of the application device.

It has been shown that by means of a vacuum, relatively precisely defined portions can be created in the laminating foil element which can be sufficiently far deflected out of the application plane so as to create particularly well-defined regions free of adhesive on the surface of the laminating foil element.

For creating at least some portions of this kind in the laminating foil element, it is advantageous for the deflection arrangement to comprise at least one deposit part for depositing a laminating foil element, the deposit part comprising at least one concave cavity, preferably a plurality of concave cavities, for aspirating a portion of the laminating foil element.

By means of these concave cavities, portions of the laminating foil element can be deflected particularly easily and with operational safety from the normal foil plane or from the application plane, respectively, by drawing portions of the laminating foil element into the respective cavity.

Advantageously, a suitable pressure difference pump can be used to create a vacuum or a partial vacuum in the concave cavity, drawing at least portions of the laminating foil element into the cavity.

If the depth of a cavity with respect to a deposit surface for depositing the laminating foil element is more than 0.5 mm or 1 mm, preferably 2 mm, and in particular less than 10 mm, preferably less than 5 mm, the laminating foil element can be advantageously deflected so as to safely create portions free of adhesive on the laminating foil element.

If a depth of more than 0.5 mm or more than 1 mm, preferably more than 2 mm, is provided, the laminating foil element can be deflected in these portions away from the application device to a degree which is sufficient to ensure that application means of the application device can no longer come in contact with the laminating foil element in these portions.

If the depth is less than 10 mm, preferably less than 5 mm, the risk of a plastic deformation of the laminating foil element can be avoided, which otherwise might impair surface quality of the laminating foil element.

In addition, with the proposed dimensions, the laminating foil element is still sufficiently flat so that the present invention can normally be also used in existing plants for lamination of a component, provided that they have been accordingly modified.

Alternatively, the deflection arrangement can be developed further when it comprises at least one deposit part for depositing a laminating foil element, the deposit part comprising at least one opening, preferably a plurality of openings, for sucking a portion of the laminating foil element.

Other than a cavity, an opening according to the invention can be a complete through hole in a deposit part so that the deposit part will have a substantially planar, two-dimensional shape.

The cavity, in contrast, preferably has only a small vacuum opening, preferably in a concave wall of the deposit part, so that a vacuum can be created in the cavity.

The cavity forms a recess in the surface facing the application device. Therefore, a deposit part of this kind will have an at least partially three-dimensional shape.

In addition, the portions of the laminating foil element which are free from adhesive can have nearly any planar geometrical shape since cavities or openings provided in the deposit part can have almost any kind of contour.

If desired, cavities and openings can also be provided in combination.

Also, a deposit part according to the invention can be implemented in many different ways. For instance, it can comprise an endless conveyor belt with openings or concave cavities.

Alternatively, the dimensions of the deposit part can approximately correspond to the dimensions of one or more laminating foil elements to be applied.

Advantageously, at least one deposit part comprises a tray, preferably a heated tray.

In preferably heated trays used as deposit parts, those tray wall portions by means of which areas free from foil are to be created on the component to be laminated, can be set deeper than other wall portions of the respective tray, and cavities can be evacuated in this manner. Those portions of the laminating foil element which are not supposed to receive adhesive are then drawn downwards, away from the application device and into the cavity, and are not covered with adhesive when passing through the application means, in particular the application roller, as has already been described above.

The trays can be trays according to the state of the art which have been merely modified by the provision of one or more openings according to the invention.

Otherwise, they can be designed entirely new, especially in case of the optional new cavities.

The trays can preferably always be transported back into a basic position by means of a separate conveying system or the present transport unit, so as to again pick up laminating foil elements and move them with respect to the application device.

Independently of the preferred embodiment of the deposit part, the deposit part in any case has a deposit surface on which a laminating foil element can be deposited in planar form for transport and processing according to the present invention.

Another preferred embodiment provides for the device to be characterized by a positioning unit, in particular a print-to-part system, for precise positioning of the laminating foil element with respect to the deflection arrangement, in particular with respect to a deposit part for depositing the laminating foil element.

With the positioning unit proposed here, adhesive can be applied even more precisely and thus even more securely on those places on the laminating foil element where the adhesive is to take effect during and after lamination.

Conversely, this also means that portions free from adhesive can be located very precisely on the laminating foil element, saving a maximum of adhesive material.

For precisely positioning the laminating foil element, preferably a currently already employed print-to-part system can be used by means of which the device can be equipped with a suitable positioning unit in a particularly inexpensive manner.

According to a third aspect of the invention, the object of the invention is also achieved by a system for laminating a component with a laminating foil element, comprising a device for laminating the laminating foil element onto the component and comprising a transport unit for transporting the laminating foil element to the device for laminating, the system being characterized by a device for laminating and/or for applying adhesive on a surface of a laminating foil element according to one of the characteristics described here.

If the laminating system is equipped with the present device for application, the components can be laminated more advantageously with laminating foil elements.

Preferably, the transport unit for transporting the laminating foil element to the device for lamination and the transport unit for causing a relative movement between the application device and the laminating foil element are the same, which substantially helps to reduce the construction effort required for providing the system and in particular the device for the application of adhesive.

Furthermore, the system can also be characterized either by a punching device integrated in the lamination device or by a suitable downstream punching device for punching out the laminated laminating foil element.

According to a fourth aspect of the invention, the task of the invention is also achieved by a component.

According to a fifth aspect of the invention, the task of the invention is also achieved by a method for laminating a laminating foil element onto a component, wherein a designated portion of the component at the laminating foil element, which is free from foil, with respect to an area of the component which is to be free from foil and with respect to other surrounding areas of the laminating foil part is deflected in a lamination tool so far, such that during lamination of the laminating foil element onto the component, this portion comes hardly in contact with the component, so that after lamination of the laminating foil part, this portion can be removed more easily from the other surrounding portions of the laminating foil part.

In this manner, an area free from foil can be created on an otherwise laminated component both securely and inexpensively, in terms of process engineering as well as device engineering, which area as a result will not be laminated with the laminating foil part.

In particular, a preferred type of method is proposed wherein the portion of the laminating foil part in respect to the designated foil-free area is delimited for printing from other surrounding portions of the laminating foil part, wherein with this method this delimited portion is deflected during lamination into an additional material recess of a tool half of a laminating tool by means of a vacuum, such that this portion during lamination of the laminating foil element does not or only insufficiently come in contact with the component, such as to be more easily removed from the component after lamination.

The designated portion free from foil is preferably delimited from the surrounding portions of the laminating foil element as a separate vacuum circle.

For this purpose, additional sealing elements in a conventional laminating tool, in particular in a vacuum laminating tool, are used.

Preferably, the portion delimited by the separate vacuum circle is then deflected within an upper mold of the laminating tool during lamination.

In this manner, an additional geometrical spacing is produced between the portion of the laminating foil element and the component to be laminated, preventing a lamination in this area.

In other words, by means of an additional deflection, actual adhesive contact between the laminating foil element covered with adhesive and the component is prevented.

Preferably, a tool suitable for this purpose, in particular an upper mold, has a surface enlargement structure, for instance a waffle structure, in this portion for better cooling.

It is particularly advantageous if the first tool half, especially in the portion of the additional material recess, is cooled such that an adhesive applied on the laminating foil element in this region loses its adhesive power at least to a substantial degree.

This helps to guarantee even more effectively that this portion does not combine with the component such that it can be easily removed from the component, creating an area free from foil on the final laminated component.

In order to implement the method according to the fifth aspect of the present invention without problems, it is advantageous for a laminating tool to have a deflection cavity into which portions of a laminating foil element can be deflected before or during lamination on a carrier part or component.

Deflection may take place by means of vacuum or partial vacuum of a pressure difference pump at the deflection cavity.

In addition, even without the other features of the invention, it is advantageous if the interspaces between a carrier part or component to be laminated and the laminating foil element are flushed with a fluid, in particular with air, allowing faster and therefore more effective cooling of an adhesive, such that an unintended adhesive contact between laminating foil element and carrier element can be avoided.

This is especially advantageous with a closed laminating tool, causing hardly any delay in the course of the process.

Furthermore, according to a sixth aspect of the invention, the object is also achieved by means of a method of applying adhesive on a surface of a laminating foil element for laminating a component, in particular an automotive lining component, where an application device for the planar application of adhesive and the surface of the laminating foil element are brought in effective contact with each other on an application plane, and where the application device and the laminating foil element are moved in relation to one another for a planar application of the adhesive on the surface of the laminating foil element, with portions of the laminating foil element's surface being deflected from the application plane such that adhesive is only applied on some portions of the laminating foil element's surface.

In this way, an extraordinarily simple process method is provided by means of which desired portions of the laminating foil element can be left free from adhesive with respect to a component.

In this manner, consumption of adhesive and cost therefore can be minimized with respect to other techniques used in the state of the art.

In particular, portions which are to be laminated without an adhesive, that is, portions of a laminating foil element which are to be left free from adhesive, can be created outside a laminating device.

Thus, another important advantage, in addition to saving adhesive—since portions of a laminating foil element are not covered with adhesive—, is a substantial simplification of the construction of, in particular, laminating tools. This helps to construct such tools much easier such that also the risk of failure of currently used laminating systems can be substantially reduced.

The consumption of adhesive can be further reduced if there are even less areas covered with adhesive on a laminating foil element by also leaving spaces between cavities and/or openings, as well as outputs, which are free from adhesive.

The solutions for applying adhesive on a laminating foil element which are proposed herein can also be employed in standard laminations since adhesive in the interspaces and outputs can be left away and saved if the method or the device is adapted accordingly.

In general, in a currently employed system for laminating a component with a laminating foil element, (at least) approximately 50% of the amount of adhesive can be saved. For example, assuming a format size of 800 mm×2000 mm of a laminating foil element and approximately 7 € for 1 kg of adhesive, 1000 cars a day, 220 workdays per year and 7 years runtime (0.8 m×2 m×50%×1000 cars×220 days×7 years), approximately 862,400.00 € can be saved.

At the same time, the employed tools also become cheaper because of the simpler construction, resulting in further cost advantages.

It is also advantageous if the surface of the laminating foil element is deflected out of the application plane such that portions of the surface of the laminating foil element are left free from adhesive, these portions being located especially within or in boundary areas of the laminating foil element.

In this manner, portions both inside and outside of the laminating foil element can be left free from adhesive such that these portions can be drawn off the laminated component and disposed off quite easily after a laminating process without these separated portions of the laminating foil element being contaminated with adhesive.

Portions of the laminating foil element free from adhesive can be produced especially on boundaries of the adhesive foil element, that is, specifically in a foil output of a tool, if the surface of the laminating foil element is partially deflected out of the application plane such that regions free from adhesive are produced on the surface of the laminating foil element, bordering on an adhesive layer produced on the surface.

Cumulatively or alternatively, portions free from adhesive can also be produced without any problems within a laminating foil element surface if the surface of the laminating foil element is partially deflected out of the application plane, such that portions free from adhesive are produced on the surface of the laminating foil element which are at least partially or entirely surrounded by adhesive.

If portions of the surface according to the invention are deflected out of the application plane, portions free from adhesive can be created as desired in a very simple manner on the respective laminating foil element.

Advantageously, the laminating foil element is already partially lifted off the application device before or during application of the adhesive, in order to provide the surface of the laminating foil element only partially with an adhesive layer. In this case the laminating foil element has been moved partially away from the application device during the application of the adhesive, partial portions of the surface of the laminating foil element can only be partly covered with an adhesive layer, while directly adjacent portions of the laminating foil element remain free from adhesive.

It has been shown that a deflection according to the invention can be performed very easily, subjecting the laminating foil element to little strain, if the laminating foil element is partially sucked during application of the adhesive so as to provide the surface only partially with an adhesive layer.

By partial suction of the laminating foil element, portions of the laminating foil element will be moved away from the application device which will then no longer be reached by application means of the application device, creating portions on the surface of the laminating foil element which are free from adhesive.

Other portions of the laminating foil element which are directly adjacent to the portions mentioned above, on the other hand, do indeed with the present method come in effective contact with application means of the application device, such that in those areas, adhesive is transferred to the laminating element.

Thus, both portions with and without adhesive can be produced on the laminating foil element, which process is simplified by a pressure difference pump.

According to a seventh aspect of the invention, the object is also achieved by a component for lamination with a laminating foil element, the component having at least one area to be laminated permanently, onto which area the laminating foil element can be permanently laminated on a lamination plane, in particular on a profiled lamination plane, the component temporarily having at least one differently structured area embodied such that only portions of the same, or preferably none at all, come in effective contact with the laminating foil element. In this manner, an adhesive force between the laminating foil element and the carrier part can be partly avoided.

In particular, higher removal speeds can be achieved.

Advantageously, the at least one differently structured portion has a surface or surface texture different from the at least one portion to be laminated permanent such that, in particular, better cooling can be achieved in the differently structured portion.

If the at least one differently structured portion has a honeycomb-like shape, the cooling effect can be substantially increased by a significantly larger cooling surface.

Such a honeycomb-like or corrugated structure is characterized by recesses which traverse the surface of the laminating foil element.

Advantageously, the at least one differently structured portion is formed by at least two honeycomb elements, preferably an assemblage of honeycomb elements, which makes it possible to achieve a good stability and surface enlargement of the laminating foil element.

If the at least one differently structured portion with respect to the lamination plane is arranged at least temporarily next to the at least one portion to be laminated permanently, the component and the laminating foil element, respectively, can be provided with a very stable contour, further improving a handling of the component.

In particular, higher removal speeds can be achieved.

The same applies if at least two differently structured portions are mutually spaced at least temporarily by at least one portion to be laminated permanently with respect to the lamination plane.

The object of the invention is also achieved by use of a deposit part for providing a laminating foil element on a lamination system for laminating an automotive lining component or the like to create portions free from adhesive on a surface of this laminating foil element.

Especially by means of a deposit part adapted accordingly—as already explained above—, portions free from adhesive can be created very easily on a laminating foil element.

In addition to the objects claimed in the claims which are already explained above, a method of producing a planar adhesive layer on a semi-finished product should advantageously also be mentioned, in which a means of adhesion, such as, for example, a suitable adhesive, is transferred to a surface of the semi-finished product by means of an application device, in particular an application roller for the application of adhesion means; wherein the application device and the surface of the semi-finished product are brought in effective mutual contact, for which purpose the semi-finished product is placed on a deposit part; and wherein subsequently the application device for planar application of the adhesion means and the semi-finished product are moved towards and in relation to one another; and wherein the surface of the semi-finished product is only partially brought in effective contact with the adhesion means by displacing portions of the semi-finished product into cavities or through openings of the deposit part.

At this point, it should also be explicitly pointed out that both in terms of process engineering and device engineering, it is extremely easy with the present invention to amend and retrofit a system for laminating a component with a laminating foil element, or for producing a laminated automotive lining component, respectively, for other components to be laminated, since basically merely the deflection arrangement has to be modulated differently for this purpose; in particular, only differently designed deposit parts must be used in order to retrofit the system for new components.

By means of the proposed device and system, the alternative methods can be performed advantageously.

It is understood that features of the solutions described above or in the claims can also be combined, if desired, for cumulative implementation of the advantages and effects which can be achieved.

In any case, the present invention is also characterized by the fact that by means of a deflection arrangement, portions of a laminating foil element are deflected out of an application plane in which adhesive is applied on the laminating foil element, and/or out of a lamination plane defined by a carrier part profile, on which plane a laminating foil element is laminated onto a carrier part or component, in such a way that areas free from foil can be produced in a very simple manner on the component.

At this point, it should also be mentioned that within the framework of the present patent application, the wording "in particular" is always to be understood as pointing out an optional, preferable characteristic. It is not to be understood in the sense of the word "namely".

Furthermore, it is to be pointed out that within the framework of the present application, indefinite articles and numerals such as "one", "two" etc. are normally to be understood as indicating a minimum, that is, "at least one", "at least two" etc., unless it is clear from the context that only "exactly one", "exactly two" etc. can be intended.

In addition, other features, effects and advantages of the present invention are explained by means of the attached drawing and the subsequent specification, wherein both a device for applying adhesive on a surface of a laminating element and a device for laminating a laminating foil element are shown and described.

Components shown in the drawings whose functions are at least substantially identical can be indicated by the same reference numbers, where the components do not need to be indicated and explained in all figures.

In this example of embodiment, the device 1, shown in FIGS. 1 through 4, for applying adhesive 2 on a surface 3 of a laminating foil element 4 (indicated here only by way of example) for laminating a component 5 is merely one of several processing stations 6 (not shown) of an only schematically indicated system 7 for laminating a component 5 with a respective laminating foil element 4. In total, according to FIG. 1, four laminating foil elements 4 of this type are shown.

Component 5, which is shown only exemplarily in the context of the present invention, can be any component 5 which can be used in many different ways. Preferably, the present component 5 is an automotive lining component, in particular an automotive inner lining component, which is to be upgraded by the laminating foil element 4.

Thus, the laminating foil element 4 can be a decorative layer (not referenced again) for giving an impression of higher value, in optical, but generally also in haptic terms.

Seen in the machine direction 7, that is, in the transport direction of the laminating foil element 4, the device 1 for applying adhesive 2 is arranged before a device (not shown) for laminating the laminating foil element 4 onto the component 5 of the system 7.

The device 1 comprises an application device 10 for applying adhesive 2 onto the surface 3 of the laminating foil element 4, wherein for applying the adhesive 2, application means 11 are provided, embodied in this specific example of embodiment by an application roller element 12.

The application device 10 also comprises an adhesive reservoir 13 containing adhesive 2.

The adhesive reservoir 13 is positioned above the application means 11 and the application roller element 12 thereof, such that the application roller element 12 can be charged with adhesive 2 by the force of gravity.

The application roller element 12 forms the lower end of the adhesive reservoir 13.

The device 1 is further characterized by an application plane 15 (see especially FIG. 2) opposite to the application device 10. More precisely, the application plane 15 is located beneath the application device 10.

On this application plane 15, the adhesive 2 is transferred from the application roller element 12 to the surface 3 of the laminating foil element 4 which faces the application device 10.

In this example of embodiment, the application plane 15 is substantially built by a transport unit 18 by means of which individual laminating foil elements 4 are transported through the device 1 and in particular through the system 7.

The transport unit 18 allows, specifically in the device 1, a relative movement between the laminating foil element 4 and the application device 10 located above it.

For this purpose, the transport unit 18 has an endless circulating transport belt 19; in this example of embodiment, advantageously, the transport belt 19 of a DMY conveyor (not separately referenced) of the system 7. This helps to keep the construction of the present device 1 simpler.

In particular, the device 1 according to the invention is further characterized by a deflection arrangement 20 by means of which the respective laminating foil element 4 can be partially deflected with respect to the application device 10 with a deflection direction 21, the deflection direction 21 leading away from the application device 10.

In particular, a deflection movement 22 of the areas 25, 26, 27 etc. of the laminating foil element 4 in the deflection direction 21 transverse to the machine direction 7 or the application plane 15 is envisaged for implementing these areas 25, 26, 27 etc. without adhesive.

In FIGS. 1 through 4, the areas 25, 26, 27 etc. are marked, i.e. surrounded by border edge lines, for better visibility.

Thus, the areas 25, 26, 27 etc. very precisely indicate the contours 28 (indicated only by way of example) of areas 29 (indicated only by way of example) on the laminating foil element 4 which are left free from adhesive.

With the device 1 described here, the surface 3 of the laminating foil element 4 is deflected in such a way out of the application plane 15 that adhesive 2 is only applied on portions of the surface 3 of the laminating foil element 4.

In this manner, the application device 10 applies, i. e. produces, an adhesive layer 31 on the laminating foil element 4 only in those portions 30 which are or were not deflected out of the application plane 15 according to the invention.

The application plane 15 is arranged between the application device 10 and the deflection arrangement 20.

Thus, the deflection arrangement 20 and the application device 10 are located on different sides 33 and 34 of the application plane 15 or the laminating foil element 4, respectively; the application device 10 being positioned above the application plane 15 on the first side 33 and the deflection arrangement 20 on the second side 34 of the application plane 15 which is opposite the first side 33.

Substantially on the side 34 of the application plane 15 which is opposite to the application device 10, a pressure difference pump 35 is located by means of which a vacuum or a partial vacuum can be created on the surface 36 of the laminating foil element 4 which is opposite the application device 10, so that the surface 3 of the laminating foil element 4 can be deflected in portions from the application means 11 or from the application roller element 12 of the application device 10, respectively.

For allowing the vacuum to act on the laminating foil element 4 in an even more targeted manner, the deflection arrangement 20 also comprises deposit parts 40 (here only referenced by way of example) for depositing the laminating foil elements 4, the deposit parts 40 each having at least one concave cavity 41 which is only suggested in the drawing and which is substantially congruent with the areas 25, 26, 27 etc. which will subsequently be free from adhesive; so that these areas 25, 26, 27 etc. are drawn into the cavities 41 at least to a certain extent by means of the partial vacuum.

In this manner, the laminating foil element 4 is deflected out of the application plane 15 at least above the provided cavities 41.

For this purpose, a depth 42 (see FIG. 4) of approximately 2 mm is already sufficient for a vacuum or partial vacuum space, such as, for instance, the cavity 41 or a through opening (not shown) in the deposit part 40 which has some other form.

This depth 42 is preferably measured in the direction 21 of deflection from a deposit surface 43 for depositing the laminating foil element 4 on the deposit part 40.

For as precise an alignment as possible of the laminating foil parts 4, with their designated areas 25, 26, 27 etc. free from adhesive, with the cavities 41 of the deposit parts 40, the device 1 also has a positioning unit not shown here in detail, which is implemented in this example of embodiment by a print-to-part system which is already known and operates with sufficient reliability.

Figure 1:
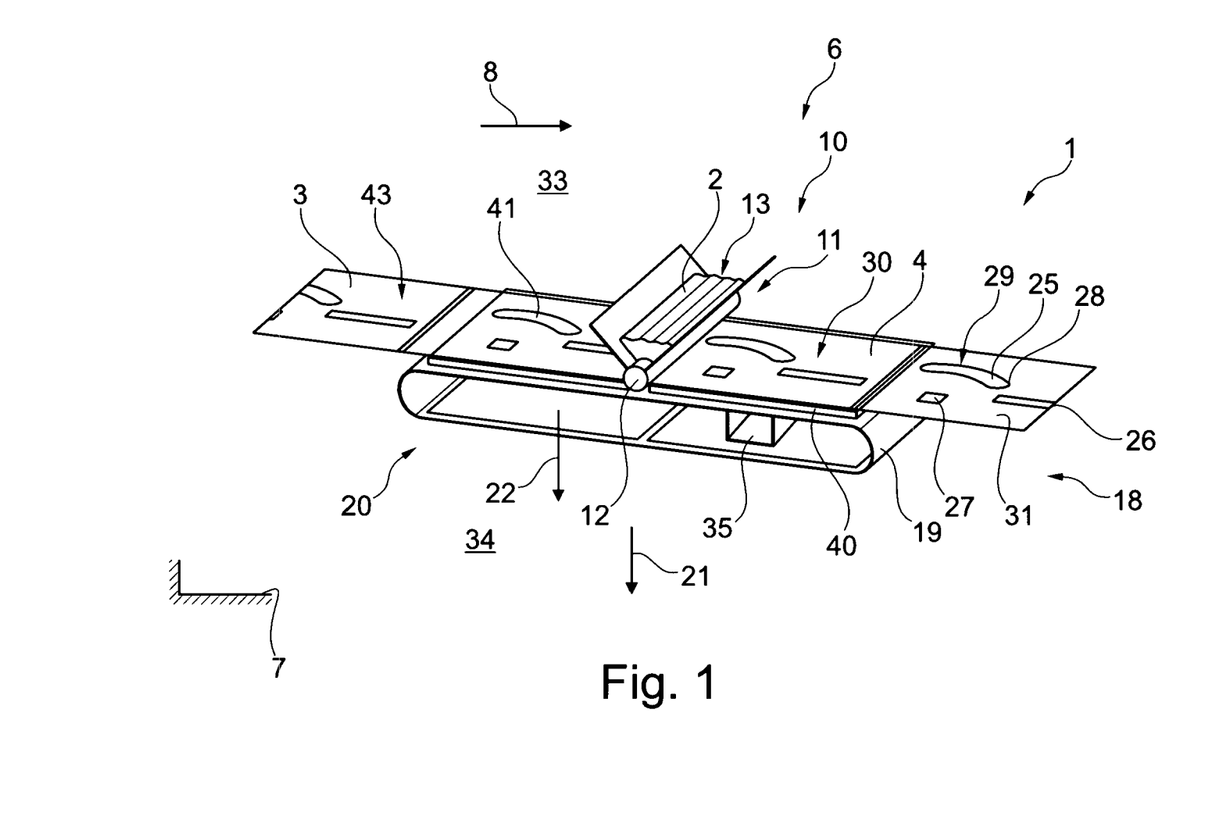
FIG. 1 schematically shows a perspective view of a device for applying adhesive on a surface of a laminating element, having a deflection arrangement for deflecting portions of the laminating foil element out of an application plane on which adhesive is transferred to the surface of the laminating element by an application device.
Figure 2:
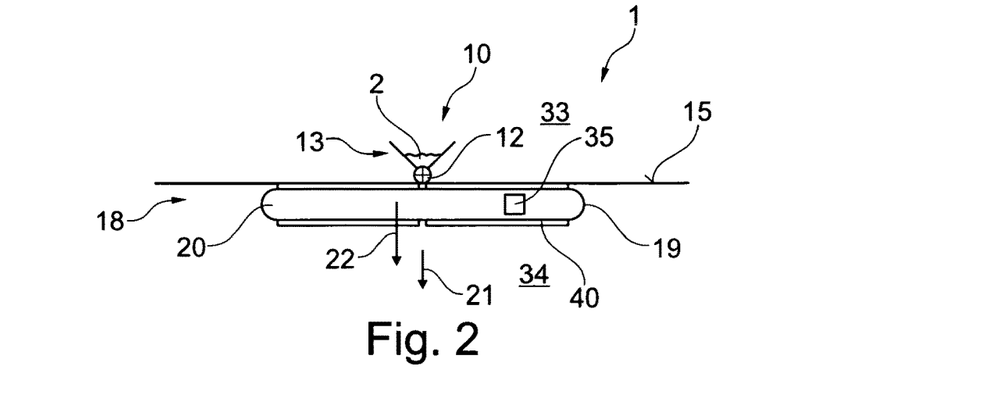
FIG. 2 schematically shows a lateral view of the device in FIG. 1.
Figure 3:
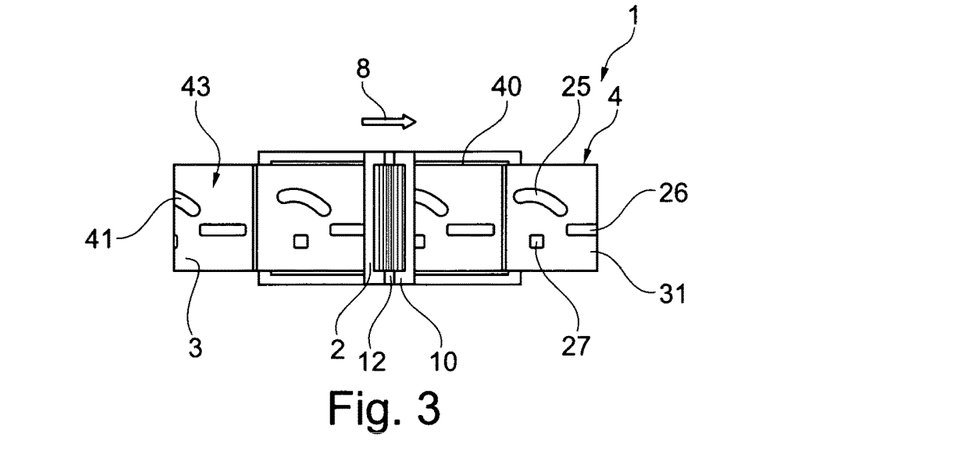
FIG. 3 schematically shows a top view of the device in FIGS. 1 and 2.
Figure 4:
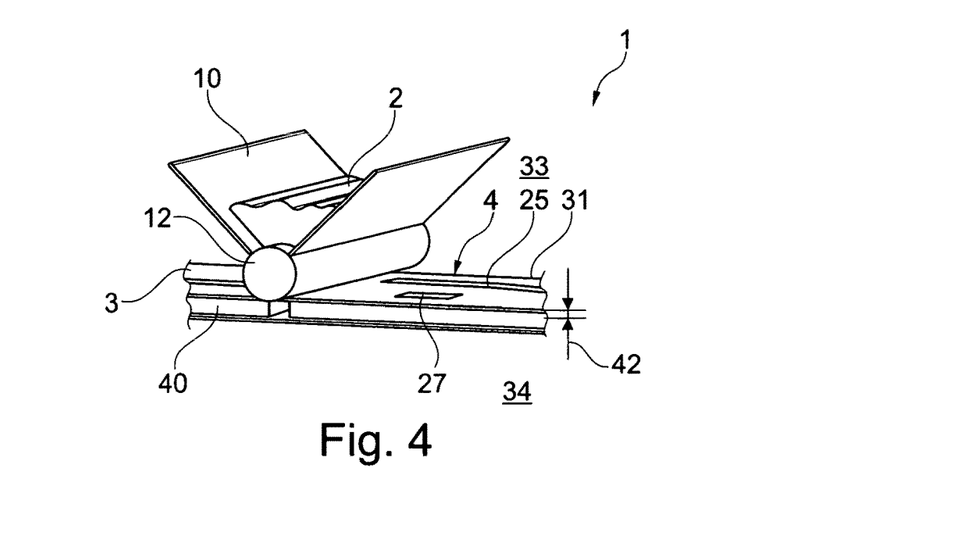
FIG. 4 schematically shows a detailed view of the application device in FIGS. 1 to 3.
Figure 5:
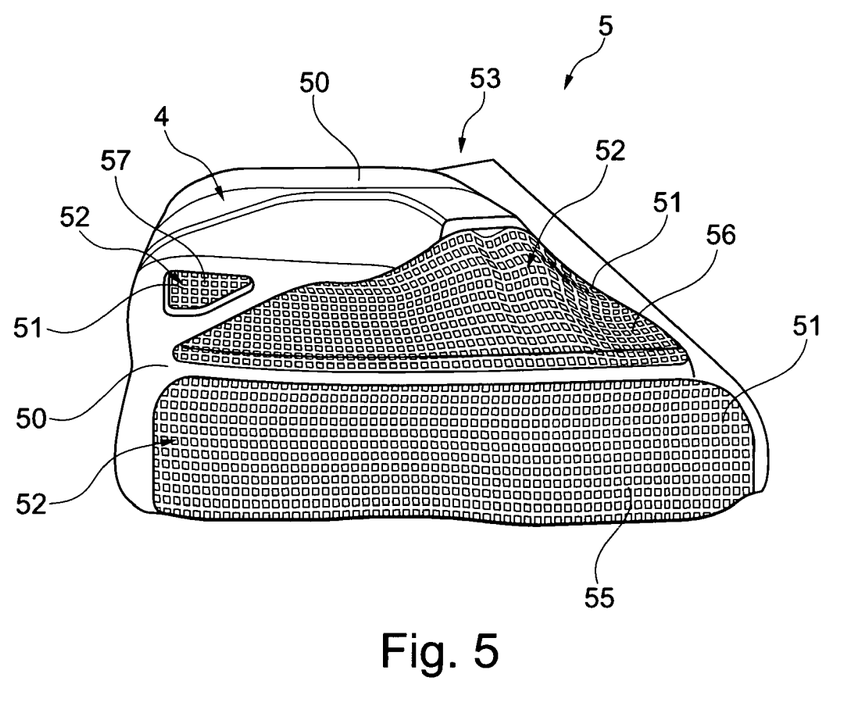
FIG. 5 schematically shows a perspective view of a component to be laminated with a laminating foil element, i. e. of the laminating foil with the component arranged below it, respectively.

In FIG. 5, the abovementioned component 5 with the laminating foil element 4, which has partially been laminated onto the component, is shown by way of example, with this example of embodiment showing an automotive inner lining component (not referenced separately).

The laminating foil element 4, which has been partially applied, has portions 50 (only referenced by way of example) laminated permanently onto the component 5, which are substantially smooth, as well as other portions 51 not laminated onto the component 5 which are structured differently.

In this example of embodiment, it is easy to recognize portions (only referenced by way of example) of the component 5 onto which portions 50 of the laminating foil element 4 which are covered by adhesive are to be laminated permanently.

It is also easy to recognize other portions 51 with different structures (only referenced by way of example) of the component 5, or of the laminating foil element 4 laminated onto it, respectively, which are to be embodied as areas 52 free from foil. In other words, the areas 52 of the component 5 which are free from foil will subsequently be located in the positions corresponding to the differently structured portions 51 when the latter have been removed.

The differently structured portions 51 have been produced by deflecting or sucking, respectively, these differently structured portions 51 into a tool half of a lamination tool which is provided with a deflection cavity so as to avoid or minimize effective adhesive contact between the component surface and the adhesive surface of the laminating foil element 4.

Cumulatively or alternatively, according to one of the present aspects, the portions 25, 26, 27 etc. of the laminating foil element 4 which are free from adhesive can be made congruent with the differently structured portions 51 of the component 5 during lamination.

The component 5 defines a profiled lamination plane 53 onto which the laminating foil element 4 is to be permanent laminated in the end while leaving the areas 52 free from foil.

In another embodiment or method, which is also particularly advantageous, it can be envisaged that the entire component 5, that is, both (text missing)

Advantageously, the component 5 which is only shown by way of example in FIG. 5 can be substantially produced according to any of the aspects on which the invention is based.

At this point, it should also be mentioned that in the positions of the differently structured portions 51 represented here, a so called hand rail field 55, a door means field 56, a loudspeaker field 57 or the like can be located later on.

Figure 6:
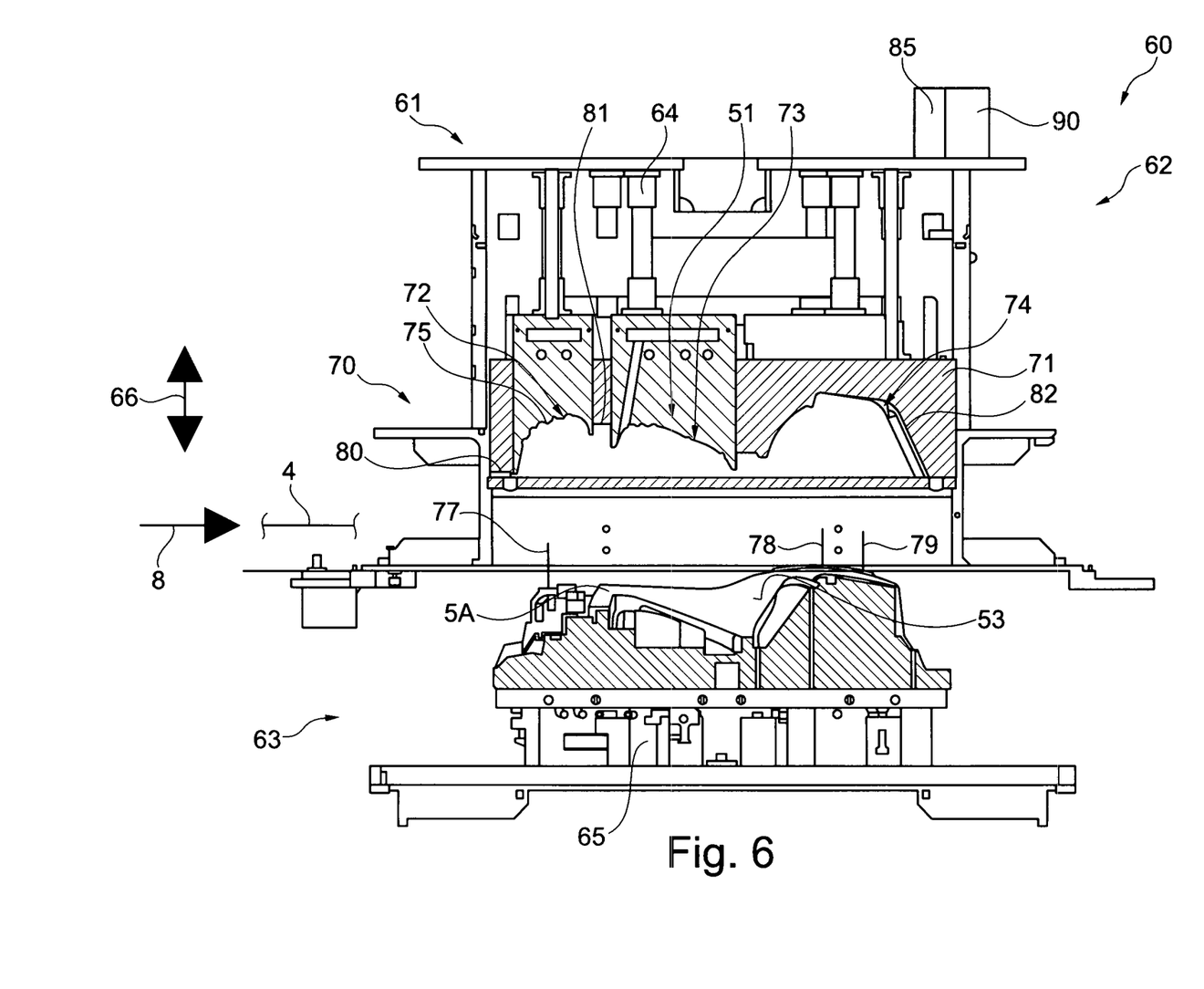
FIG. 6 schematically shows a partially cut view of a device for applying a laminating foil element with an open lamination tool, comprising a deflection arrangement for deflecting the laminating foil element out of a profiled lamination plane.
Figure 7:
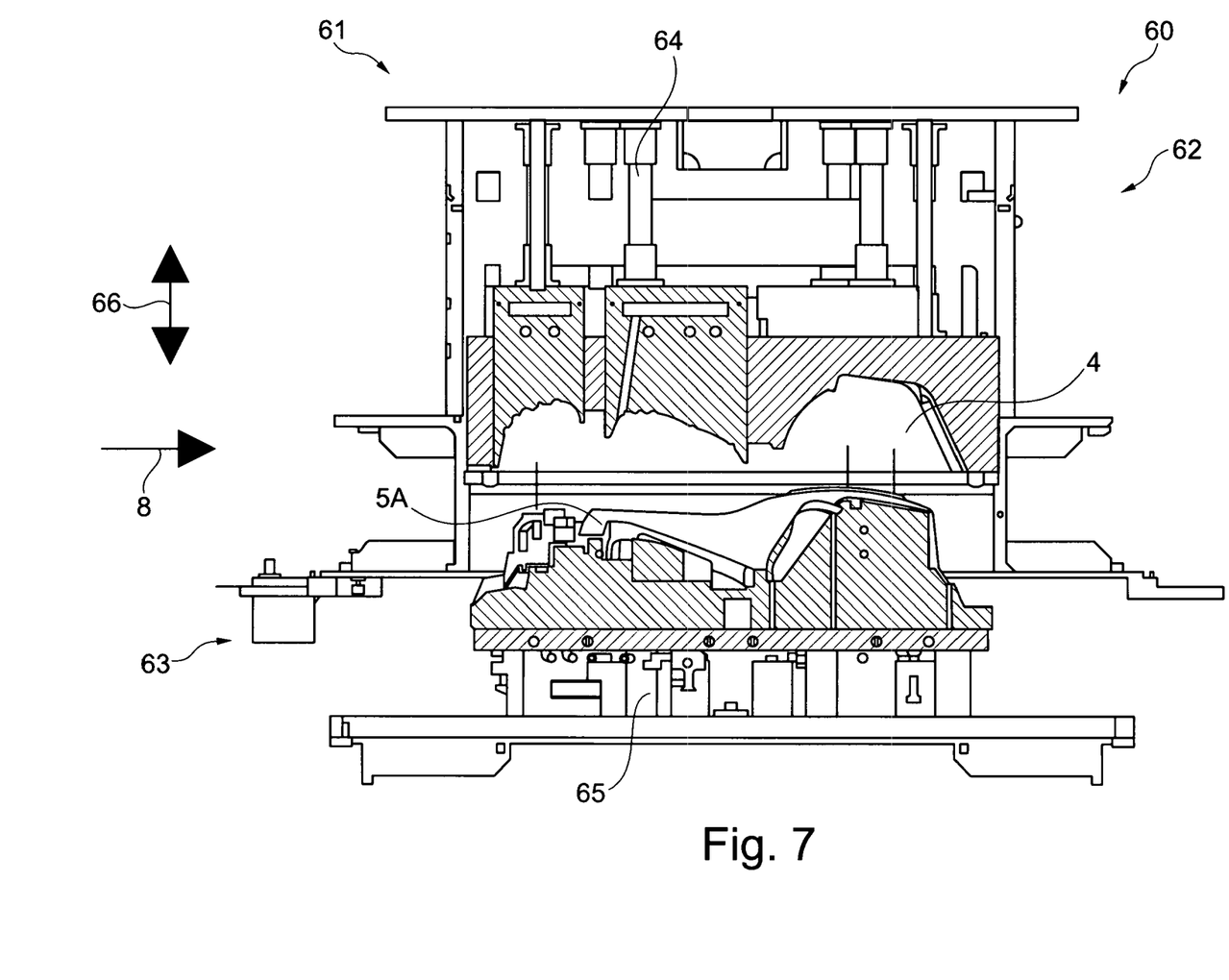
FIG. 7 schematically shows another partially cut view of the device in FIG. 6 with a closing lamination tool.
Figure 8:
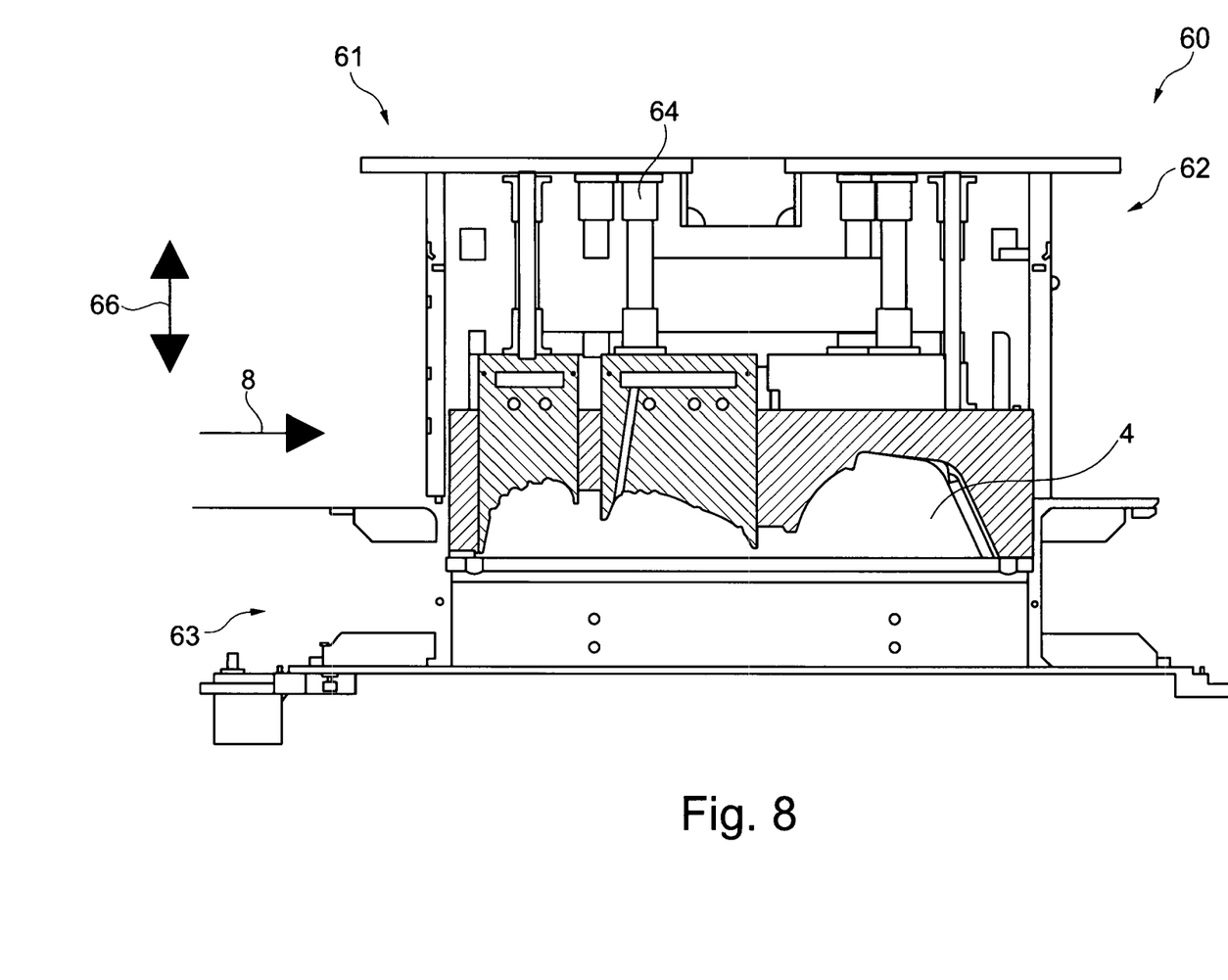
FIG. 8 schematically shows another partially cut view of the device in FIGS. 6 and 7 with a closed lamination tool.

In FIGS. 6 through 8, a device 60 for applying a laminating foil element 4 and a component 5 laminated with the same (see FIG. 8) are shown.

FIG. 6 shows the device 60 with an open laminating tool 61 comprising a first tool half 62 (upper tool half) and a second tool half 63 (lower tool half).

The tool halves 62 and 63 are arranged in the device 60 in such a way that they can move towards and away from each other in the closing and opening direction 66 by means of hydraulic cylinders 64 and 65.

On the second tool half 63, a carrier part 5A is supported which forms the final laminated component 5 together with the laminating foil element 4.

The laminating foil element 4 is fed to the lamination tool 61 in the machine direction 8 as a flat foil element (not referenced separately), the machine direction 8 in this example of embodiment going from left to right.

The device 60 has a deflection arrangement 70 for deflecting portions of the laminating foil element 4 out of the profiled lamination plane 53.

In this example of embodiment, the profiled lamination plane 53 extends together with the surface of the carrier part 5A, with the tool halves 62 and 63 comprising respective mold elements 71 (referenced only on the first tool half 62), which also correspond to the profiled lamination plane 53.

In this example of embodiment, the deflection arrangement 70 comprises several deflection cavities 72, 73 and 74 whose openings (not shown here) preferably extend in or in parallel to the profiled lamination plane 53, in particular with their opening diameter contours.

The deflection cavities 72, 73 and 74 (shown only schematically) are limited by at least partially corrugated or waffle-shaped walls 75 (only referenced by way of example).

These at least partially corrugated or waffle-shaped walls 75 are created by the first tool half 62 and its mold element 71, respectively.

In addition, the laminating tool 61 has sealing elements 77, 78, 79 (only shown by way of example) in the form of sealing struts or the like in order to seal the deflection cavities 72, 73 and 74 with respect to laminating portions 80, 81 and 82 by differential pressure, at least in a closed or nearly closed state of the lamination tool 61.

The sealing elements 77, 78, 79 are wall-shaped in the form of sealing struts or the like but are shown in cross-sectional view and therefore only shown as lines.

The sealing elements form sealing edges 83 (see FIG. 9 by way of example) on the deflection cavities 72, 73 and 74 and at the laminating foil element 4, respectively, the edges having a thickness of more than 1.5 mm, in particular approximately 3.5 mm. The edges can later be used as pattern edges for cutting out the laminating foil element 4. The thickness of the sealing edges 83 is preferably lower than 10 mm.

In any case, by means of the deflection cavities 72, 73 and 74 which are spatially separated in this manner, portions which cannot be laminated, preferably in the form of differently structured portions 51, are produced in particular on the laminating foil element 4.

For producing the additional pressure difference specifically within the deflection cavities 72, 73 and 74, the device also has a suitable pressure difference unit 85 which is with reference to its individual components only schematically indicated in FIG. 6.

In FIG. 7, the lamination tool 61 has already been largely closed by means of differential pressure, the laminating foil element 4 has already been pre-blown into the first tool half 62; in particular, it has been sucked into the upper mold element 71 and, with a view to the portions which are not to be laminated, it has subsequently also been sucked into the deflection cavities 72, 73 and 74.

In this manner, the differently structured portions 51 are produced which cannot permanently come in effective contact with the carrier part 5A by adhesion.

This effect is reinforced by a cooling unit 86 for cooling these differently structured portions 51 and any adhesive applied thereon, so that this adhesive cools off very rapidly, losing its adhesive effect.

Advantageously, the device 60 also comprises a fluid flushing unit 90 (air flushing unit; see only FIG. 6) for flushing an interspace 91 (see FIG. 9) between the carrier part 5A or the component 5, respectively, to be laminated, and the laminating foil element 4, preferably with the lamination tool 61 closed and at least portions of the laminating foil element 4 pressed on the carrier part 5A, as is the case shown in FIG. 8.

Figure 9:
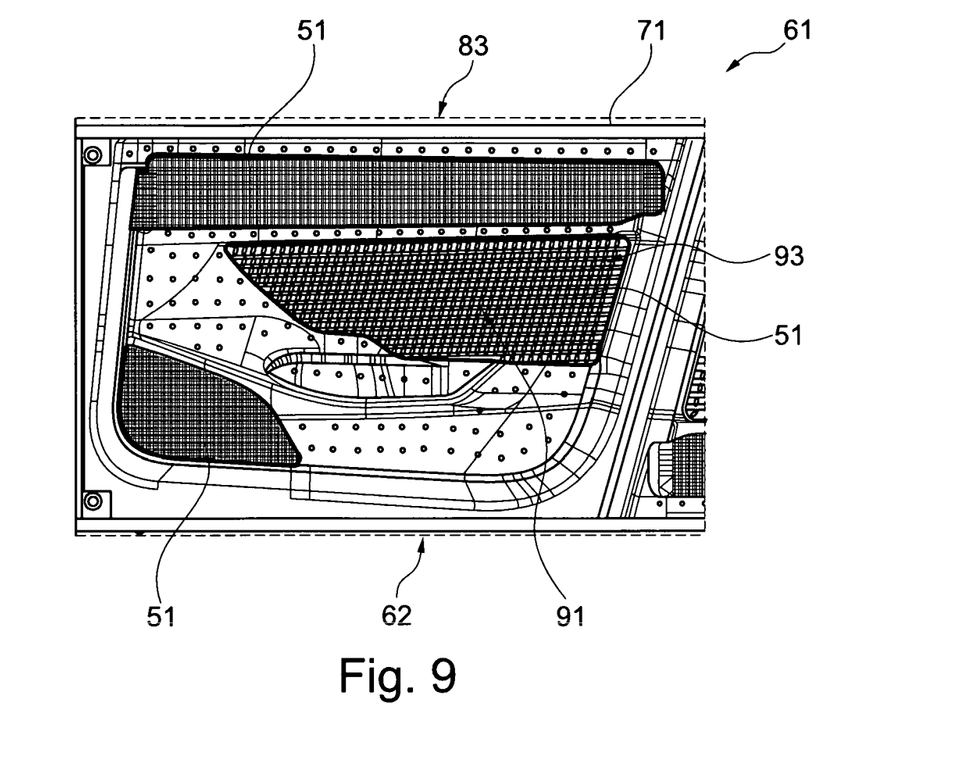
FIG. 9 schematically shows a view of the laminating foil element shown in FIGS. 6 through 8, formed with the lamination tool and applied, positioned in the upper tool half of the lamination tool.

FIG. 9 shows a bottom view of the first tool half with the laminating foil element 4 shown therein, but without the carrier part 5A.

It is easy to see the differently structured portions 51 (only referenced by way of example) with their corrugated structure, which form the non-laminated areas 93.

Figure 10:
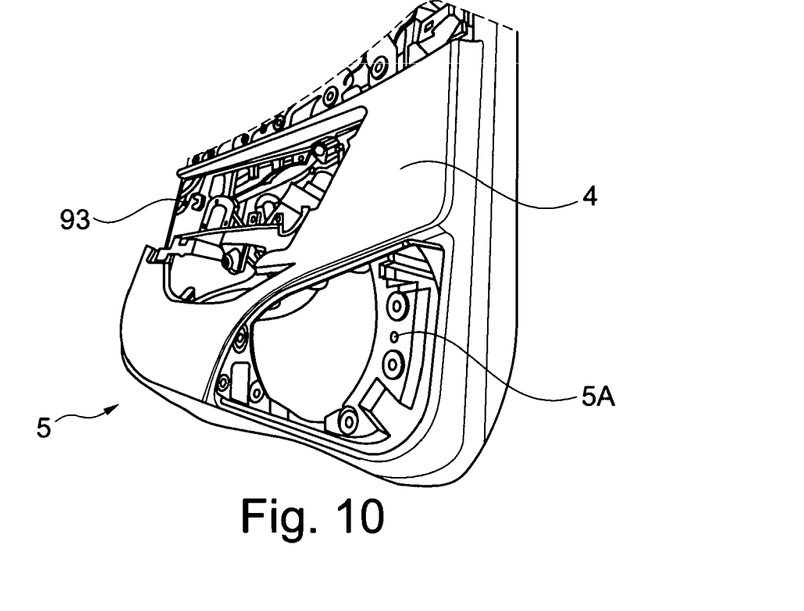
FIG. 10 schematically shows a view of the component laminated with the device in FIGS. 6 through 9, with differently structured areas already separated.

FIG. 10 shows the component 5 with the laminating foil element 4 laminated onto it, the differently structured portions 51 all having been removed, for which reason non-laminated areas 93 with the visible carrier part 5A of the component 5 can be clearly recognized.

At this point, it is explicitly pointed out that the features of the solutions described above, in the Claims and/or in the Figures, can also be combined, as desired, for cumulative implementation of the features and achievement of the effects and advantages explained.

It is understood that the example explained above is only one first embodiment of the device 1 according to the invention. The implementation of the invention is not limited to this example.

All features disclosed in the application documents are claimed as essential to the invention, provided that they are novel individually or in combination with respect to the state of the art.

LIST OF REFERENCE NUMBERS 1 device
2 adhesive
3 surface
4 laminating foil element 5 component
5A carrier part
6 processing station
7 system
8 machine direction
10 application device
11 application means
12 application roller element
13 adhesive reservoir
15 application plane
18 transport unit
19 transport belt
20 deflection arrangement
21 deflection direction
22 deflection movement
25 first portion without adhesive
26 second portion without adhesive
27 third portion without adhesive
28 contour
29 areas
30 portions with adhesive
31 adhesive layer
33 first face of application plane
34 second face of application plane
35 pressure difference pump
36 opposite surface
40 deposit parts
41 cavities
42 depth
43 deposit surface
50 portions
51 differently structured portions
52 areas with no foil
53 profiled lamination plane
55 hand rail field
56 door means field
57 loudspeaker field
60 lamination device
61 lamination tool
62 first or upper tool half, respectively
63 second or lower tool half, respectively
64 upper hydraulic cylinder
65 lower hydraulic cylinder
66 closing and opening direction
70 deflection direction
71 mold elements
72 first deflection cavity
73 second deflection cavity
74 third deflection cavity
75 walls
77 first sealing element
78 second sealing element
79 third sealing element
80 first laminating portion
81 second laminating portion
82 third laminating portion
83 sealing edges
85 pressure difference unit
86 cooling unit
90 fluid flushing unit or air flushing unit, respectively
91 interspace
93 non-laminated portions

The invention claimed is:

1. Method for laminating a laminating foil element onto carrier part for obtaining a component with a predetermined area free from foil, the method comprising:
during lamination of the laminating foil element onto the carrier part, deflecting a portion of the laminating foil element out of a profiled lamination plane of the carrier part and into a deflection cavity of a deflection arrangement arranged into at least one tool half of two tool halves of a lamination tool, wherein the portion is deflected with respect to other surrounding portions of the laminating foil element such that said portion of the laminating foil element does not come in contact with the carrier part, wherein the deflection cavity is spatially separated from laminating portions of the laminating tool by means of sealing elements,
cooling, by a cooling unit, said at least one tool half in a region of the deflection cavity, such that an adhesive applied on said portion of the laminating foil element loses its adhesive power, or such that its adhesive power is at least substantially reduced;
after lamination of the laminating foil element, removing said portion of the laminating foil element from the other surrounding portions of the laminating foil element for obtaining the component with the predetermined area free from foil.

2. Method according to claim 1, wherein said portion of the laminating foil element is deflected into the deflection cavity by means of a vacuum.

3. Method according to claim 1, comprising, with the lamination tool closed, flushing with air interspaces between the carrier part and said portion of the laminating foil element.

4. Method according to claim 1, wherein the deflection cavity of the deflection arrangement has walls at least partially corrugated or waffle-shaped.

5. Method according to claim 1, wherein the sealing elements form sealing edges on the deflection cavity.

6. Method according to claim 5, comprising cutting out the portion of the laminating foil element for obtaining the component with the predetermined area free from foil, wherein the sealing edges define a pattern to be cut.

7. Method according to claim 1, comprising transporting the laminating foil element to the laminating tool by means of a transport unit.

* * * * *